Nov. 7, 1961  D. W. GARNETT  3,007,353
FLUID OPERATED MECHANISM FOR RETRACTING METAL CUTTING TOOL
Filed Aug. 25, 1958
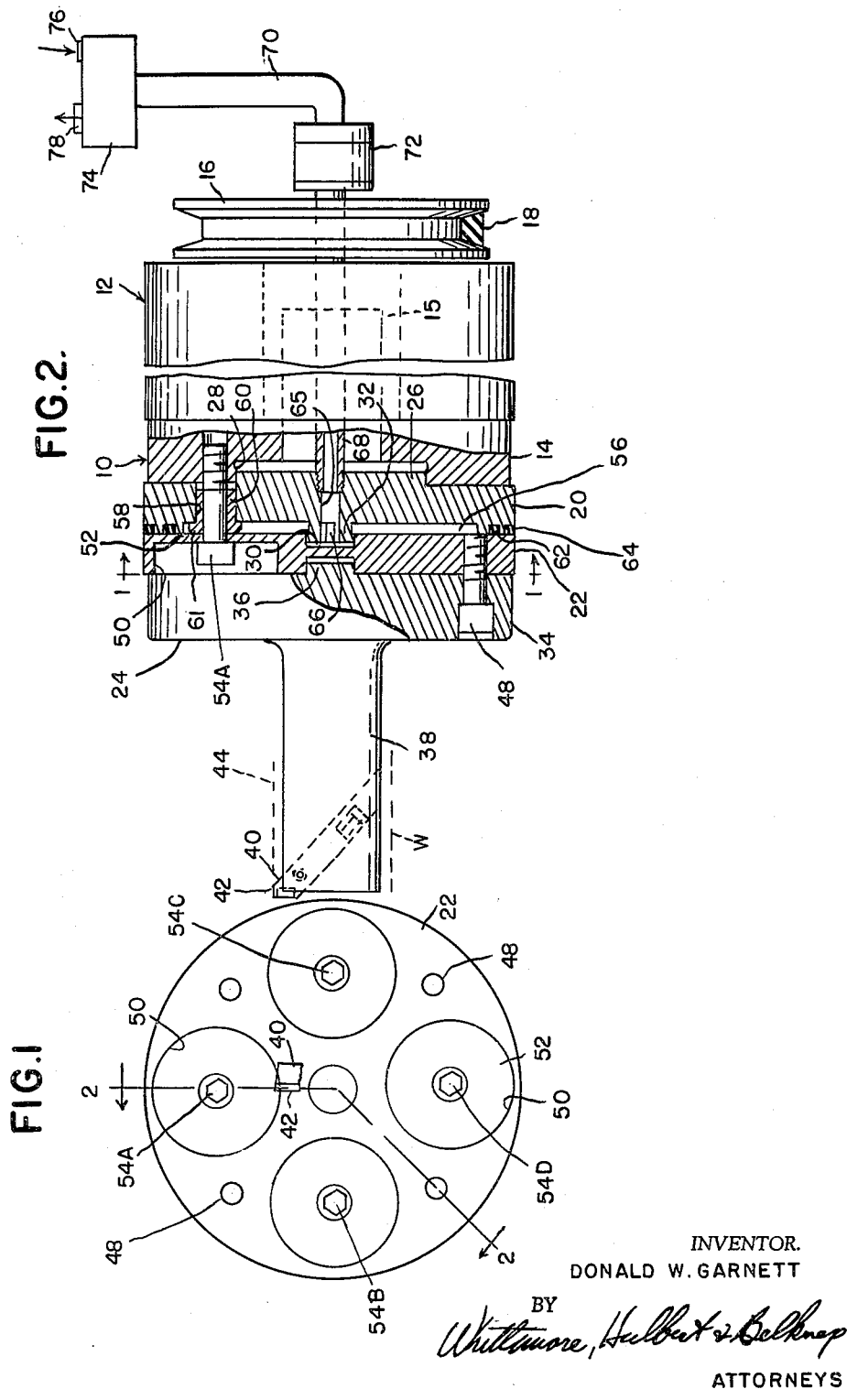
INVENTOR.
DONALD W. GARNETT
BY
Whittemore, Hulbert & Belknap
ATTORNEYS United States Patent Office 3,007,353
Patented Nov. 7, 1961

3,007,353
FLUID OPERATED MECHANISM FOR RETRACTING METAL CUTTING TOOL
Donald W. Garnett, Grand Ledge, Mich., assignor to The Olofsson Corporation, Lansing, Mich., a corporation of Michigan
Filed Aug. 25, 1958, Ser. No. 757,042
7 Claims. (Cl. 77—3)

This invention relates to metal cutting apparatus and refers more particularly to mechanism for retracting a metal cutting tool.

In apparatus of this kind, particularly for finish boring, the boring tool is advanced into the bore and, at the completion of the forward boring stroke, the tool is withdrawn. Cutting forces created by the chip formation during the forward stroke cause elastic deflection of the tool. Upon withdrawal of the tool, it will spring back nearer to its free position, thus cutting again on the withdrawal and leaving a mark on the finish bore.

One object of this invention is to provide boring apparatus so constructed and arranged as to enable withdrawal of the boring tool without marring the bore.

Another object of the invention is to provide boring apparatus as described above having fluid mechanism for retracting the boring tool radially inwardly relative to the axis of rotation thereof to clear the bore during withdrawal of the tool.

Another object of the invention is to enable the direct use of compressed air at a pressure, commonly available, as the actuating force to retract a rigidly held boring tool clear of the bore during withdrawal.

Still another object is to provide a means of retracting a boring tool clear of the bore during withdrawal of the tool in a manner that will not be affected by leakage of fluid or by wearing of mechanical linkages.

Still another object is to provide boring apparatus having first and second spindle portions, and a boring tool carried by the second spindle portion at one side of the axis of rotation of the spindle for engagement with the wall of a bore. The spindle portions cooperate to define a central chamber for fluid under pressure adapted to impose a separating force upon the spindle portions, and means are provided for opposing separation of the spindle portions at opposite sides thereof with a resistance which at said one side is less than the separating force and at the opposite side is greater than the separating force to effect a separation of the portions only at said one side. As a result, the second spindle portion is tilted relative to the first to retract the boring tool radially inwardly for withdrawal from the bore free of engagement therewith.

A further object is to provide a boring tool as above described which is dynamically balanced.

Other objects and features of the invention will become apparent as the description proceeds, especially when taken in conjunction with the accompanying drawing, illustrating a preferred embodiment of the invention, wherein:

FIG. 1 is a view of boring apparatus embodying the invention, taken on line 1—1 of FIG. 2.

FIG. 2 is a side elevational view, partly in section on the line 2—2 of FIG. 1.

Referring now more particularly to the drawing, the boring apparatus comprises a conventional spindle 10 and a spindle support 12. The spindle 10 includes a circular main body portion 14 having a reduced portion 15 rotatably supported in and extending through the spindle support 12. A pulley 16 is secured to the rear end of the reduced portion 15 to receive a belt 18 for driving the pulley and hence the spindle by any suitable source of power, not shown. The spindle 10 also includes an adapter plate 20, a retract plate 22 and a quill 24. The adapter plate 20 is circular and has a rearwardly projecting central circular boss 26 which extends into the enlarged circular recess 28 located centrally in the front face of the main body portion. The retract plate 22 is also circular and has a central recess 30 in its rear face for receiving a central pilot 32 on the front face of the adapter plate. The quill has a circular flange portion 34 at the rear formed with a central pilot 36 on its rear face which is received in a central recess in the front face of the retract plate.

The quill 24 has a forwardly projecting portion 38 which is concentric with the axis of rotation of the spindle. The portion 38 of the quill has an oblique passage adjacent its front end in which is secured a boring tool 40. The boring tool is conventional in form and material having a cutting tip 42. The tip is eccentric to the axis of rotation of the spindle and is adapted to engage the bore 44 in a workpiece W in a finish boring operation.

The flange 34 of the quill is bolted to the retract plate by an annular series of bolts 48. The front face of the retract plate is formed with four circular recesses 50 which are located inwardly of the periphery of the plate at 90° intervals around the axis of the spindle and with their axes on a circle concentric with the spindle axis. The thickness of the retract plate at the bottoms of the recesses is greatly reduced to provide the relatively thin circular webs 52. The retract plate may be formed of any suitable material such as steel and has enough inherent resilience to enable a limited flexing of the webs 52 for a purpose described more fully hereinafter.

The retract plate, adapter plate and main body portion 14 are secured together by the bolts 54A–54D. The bolts respectively extend through the webs 52 with their heads overlying the webs and their shanks threaded into the main body portion. The adapter plate is clamped between the main body portion and retract plate with its front and rear faces respectively in surface-to-surface contact therewith.

The front face of the adapter plate is formed with an annular recess 56 concentric with the axis of rotation of the spindle and of greater outside diameter than the diameter of the bolt circle of bolts 54A–54D. The rear face of the retract plate overlies the recess 56 to provide a relatively large and closed chamber. The shank of each bolt passes through an enlarged opening 58 in the adapter plate and is closely surrounded by a spacer bushing 60 of steel or like material. Each bushing has a head portion 61 which is ground to a precision thickness to allow preloading of the webs 52 in a manner to be described later.

The adapter plate has an annular O-ring seal 62 of rubber or the like disposed in an annular recess in the front face thereof surrounding the recess 56 to engage the rear face of the retract plate and prevent the escape of air, and a second O-ring seal 64 in an outer circular recess providing a dirt seal against the rear face of the retract plate.

Air under pressure is admitted to the chamber 56 by way of an axial passage 65 in the adapter plate which has a pair of opposed ports 66 in the pilot portion thereof connecting the axial passage with the chamber. Air is admitted to the axial passage by way of a pipe 68 threaded into the adapter plate and extending axially rearwardly therefrom through the main body portion 14 of the spindle and the pulley 16 for connection with a stationary air pipe 70 by means of a rotating air union 72. A 3-way valve 74 is provided for alternately admitting air under pressure to the pipe 70 through inlet port 76 and exhausting the pipe through exhaust port 78.

The heads of the spacer bushings surrounding bolts 54A, 54B and 54C are initially ground to a thickness less than the depth of the recess 56 to give the same predetermined preload to clamp the peripheral portions of the retract plate 22 adjacent said bolts under a pressure greater than will be overcome by cutting tool forces. The head of the spacer bushing surrounding bolt 54D is ground to a thickness to give a greater preload than bolts 54A, 54B and 54C to clamp the peripheral portion of the retract plate adjacent bolt 54D under a still greater pressure. The flex of webs 52 permits the bolts to be tightened metal to metal over the bushing heads 61 and have a lever action in clamping the peripheral portions of the retract plate against the adapter plate with a pressure dependent upon the preload of the webs.

In operation, the valve 74 is arranged to exhaust pipe 70 and the workpiece and spindle are moved relatively axially of one another to cause the boring tool to enter the bore of the workpiece with the cutting tip 42 in engagement with the bore. At the end of the feeding stroke, the spindle and workpiece are relatively axially moved in the opposite direction to withdraw the boring tool from the bore. Prior to initiation of the retraction stroke, the valve 74 is shifted to admit air under pressure to pipe 70 and hence to the air pressure chamber 56. Pressure chamber 56 being large in diameter provides a large actuating force, at air pressures commonly available, and far in excess of forces created by tool cutting pressure.

The pressure of air admitted is enough to overcome the pressure with which the peripheral portions of the retract plate adjacent bolts 54A, 54B and 54C are clamped against the adapter plate but not enough to overcome the pressure with which the peripheral portion of the retract plate adjacent bolt 54D is clamped against the adapter plate. Hence there will be no separation of the retract and adapter plates at the bottom (FIG. 1), but there will be separation at the top (FIGS. 1 and 2) or at the side of the axis of rotation of the spindle to which the cutting tool 42 is displaced. The retract plate is thus tilted relative to the adapter plate by the air pressure in chamber 56, which acts equally on all sides of the spindle. The webs 52 are sufficiently flexible to permit the tilting of the retract plate, which tilting occurs about an axis extending through the lower edge of the plates 20 and 22 (FIG. 1) at right angles to a plane containing the axis of rotation of the spindle and passing through bolt 54D.

The separation of plates 20 and 22 is small and not enough to break the fluid seal between the plates provided by seal 62, although sufficient to retract cutting tool 42 clear of the bore during withdrawal.

The fluid chamber 56 is centrally located and the bolts 54A–54D are equally angularly spaced on a bolt circle concentric with the axis of spindle rotation so that the spindle is inherently in dynamic balance.

The retraction of the boring tool is accomplished without wear and without subjecting the spindle bearings to external loads, and minor leakage of fluid has no effect on the tool retraction.

What I claim as my invention is:

1. Boring apparatus comprising a rotatable spindle having an axially inner main spindle portion and an axially outer tool carrying spindle portion, a boring tool on said tool carrying portion, said spindle portions being aligned and arranged end to end, said main spindle portion having at its outer end a surface transverse to the axis of rotation of said spindle and said tool carrying spindle portion having at its inner end a surface transverse to said axis of rotation in opposed, confronting relation to said surface of said main spindle portion, said tool carrying spindle portion being tiltable relative to said main spindle portion about an axis transverse to said axis of rotation of said spindle to displace said boring tool radially relative to said axis of rotation, means connecting said spindle portions together and yieldably opposing such relative tilting movement thereof, said surfaces cooperating to define a circular fluid chamber therebetween concentric with the axis of rotation of said spindle, means for tilting said tool carrying portion relative to said main spindle portion as aforesaid including said fluid chamber, and means for placing fluid in said chamber under a pressure sufficient to overcome the connecting means and effect the aforesaid tilting movement of said tool carrying portion and tool relative to said main spindle portion.

2. Apparatus comprising an axially rotatable spindle having axially inner and outer spindle portions, a tool carried by said outer spindle portion, first resilient means clamping together said spindle portions at one side of the axis of rotation of said spindle to oppose axial separation, second resilient means clamping together said spindle portions at the opposite side of said axis to oppose axial separation, said first resilient means being constructed to have less resistance to deformation and to yield under a lighter force than said second resilient means, and means for imposing an axially directed separating force on said spindle portions sufficient to overcome said first resilient means and cause said spindle portions to separate axially at said one side of the axis of said spindle, thereby to effect a tilting of said outer spindle portion relative to said inner spindle portion and a generally radial movement of said tool, said force imposing means including a fluid chamber between said spindle portions concentric with the axis of rotation of said spindle and means for pressurizing said chamber.

3. The apparatus defined in claim 2 in which each resilient means comprises a flexible resilient web on one of said spindle portions and a clamping element connecting said web to the other of said spindle portions.

4. The apparatus defined in claim 3 in which the web of said second resilient means is prestressed and deformed by the associated clamping element to a greater degree than the web of said first resilient means thus to have greater resistance to further deformation and less tendency to yield under the separating force imposed than the web of said first resilient means, and also to clamp the spindle portions together under greater pressure at said opposite side of said axis than at the said one side thereof.

5. The apparatus as defined in claim 4 in which said other of said spindle portions has stops against which said webs are clamped by said clamping elements, said stops determining the degree of prestress in said webs.

6. Apparatus comprising an axially rotatable spindle having axially inner and outer spindle portions, a tool carried by said outer spindle portion, first resilient means clamping together said spindle portions at one side of the axis of rotation of said spindle, second resilient means clamping together said spindle portions at the opposite side of said axis, said first resilient means being constructed to have less resistance to deformation and to yield under a lighter force than said second resilient means, and means for imposing an axially directed separating force on said spindle portions sufficient to overcome said first resilient means, thereby to effect a tilting of said outer spindle portion relative to said inner spindle portion and a generally radial movement of said tool, each resilient means comprising a flexible resilient web on one of said spindle portions and a clamping element connecting said web to the other of said spindle portions, the web of said second resilient means being pre-stressed and deformed by the associated clamping element to a greater degree than the web of said first resilient means thus to have greater resistance to further deformation and less tendency to yield under the separating force imposed than the web of said first resilient means, and also to clamp the spindle portions together under greater pressure at said opposite side of said axis than at the said one side thereof, said other of said spindle portions having stops against which said webs are clamped by said clamping elements, said stops determining the degree of pre-stress in said webs, said means for imposing the separating force including a fluid chamber between said spindle portions, and means for pressurizing said chamber.

7. The apparatus defined in claim 6 in which said fluid chamber is circular and concentric with the axis of rotation of said spindle.

References Cited in the file of this patent

UNITED STATES PATENTS

| 2,232,660 | Guild | Feb. 18, 1941 |
| 2,412,038 | Freisen | Dec. 3, 1946 |
| 2,916,951 | Carlson et al. | Dec. 15, 1959 |